US012196036B2

(12) United States Patent
Hales et al.

(10) Patent No.: US 12,196,036 B2
(45) Date of Patent: Jan. 14, 2025

(54) WET GLAZING SHIELD GASKET FOR FENESTRATION UNIT

(71) Applicant: JELD-WEN, Inc., Charlotte, NC (US)

(72) Inventors: Kyle David Hales, Klamath Falls, OR (US); Scott Lincoln Painter, Klamath Falls, OR (US); David Lee Yagla, Klamath Falls, OR (US); Bradley James Wirth, Market Rd. Bend, OR (US)

(73) Assignee: JELD-WEN, Inc.

( * ) Notice: Subject to any disclaimer, the term of this patent is extended or adjusted under 35 U.S.C. 154(b) by 280 days.

(21) Appl. No.: 17/649,892

(22) Filed: Feb. 3, 2022

(65) Prior Publication Data

US 2023/0243208 A1 Aug. 3, 2023

(51) Int. Cl.
*E06B 7/23* (2006.01)

(52) U.S. Cl.
CPC .................................. *E06B 7/2307* (2013.01)

(58) Field of Classification Search
CPC ........... E06B 7/2307; E06B 2003/6223; E06B 2003/6244; E06B 2003/6252; E06B 2003/6279; E06B 3/5814
See application file for complete search history.

(56) References Cited

U.S. PATENT DOCUMENTS

| | | | |
|---|---|---|---|
| 3,381,435 | A | 5/1968 | Smith |
| 4,481,736 | A | 11/1984 | Norton |
| 2003/0070371 | A1 | 4/2003 | Kobrehel |

FOREIGN PATENT DOCUMENTS

| | | | |
|---|---|---|---|
| CH | 434668 | A | 4/1967 |
| DE | 4421867 | C1 | 10/1995 |
| DE | 202005014668 | U1 | 12/2005 |
| EP | 3315710 | A2 | 5/2018 |
| FR | 2906294 | A1 | 3/2008 |
| GB | 2241529 | A | 9/1991 |
| GB | 2310242 | A | 8/1997 |
| NL | 8800508 | A | 9/1989 |
| WO | 2009103756 | A1 | 8/2009 |

OTHER PUBLICATIONS

Aluminum Trade Supply. Retrieved on the Internet from <https://www.aluminiumtradesupply.co.uk/16076/window-gaskets/>. Retrieved on Nov. 16, 2021.

Number 1 Windows. Retrieved on the Internet from <http://www.number1windows.co.uk/doors/upvc-doors-bournemouth/>. Retrieved on Nov. 16, 2021.

*Primary Examiner* — Patrick J Maestri
(74) *Attorney, Agent, or Firm* — Lorenz & Kopf LLP

(57) ABSTRACT

A wet glazing shield gasket includes a support portion and a sweep that extends from the support portion and that terminates at a barrier lip. The sweep is supported for resilient flexure between a neutral position and a flexed position relative to the support portion. Furthermore, the barrier lip is configured to engage a glazing unit for collapsing the sweep onto the support portion as the sweep flexes away from the neutral position and toward the flexed position. The sweep is configured to extend between the frame and the glazing unit and to be a barrier for the seal member as the sweep flexes away from the neutral position and toward the flexed position. The sweep and the support portion are configured to layer over each other and cooperatively occupy a gap between the glazing unit and the frame when in the flexed position.

20 Claims, 6 Drawing Sheets

WET GLAZING SHIELD GASKET FOR FENESTRATION UNIT

TECHNICAL FIELD

The present disclosure generally relates to a fenestration unit and, more particularly, relates to a wet glazing shield gasket for a fenestration unit.

BACKGROUND

Fenestration units include glazing for aesthetic and other considerations. These glazed fenestration units may include windows, glazed doors, sidelites, skylites, etc. Preferably, these fenestration units are robust, weather resistant, and highly functional. Furthermore, these units are preferably manufacturable in an efficient and cost-effective manner.

However, providing high-quality fenestration units is often associated with higher costs, longer manufacture time, higher part counts, and/or other challenges. Providing glazing for these fenestration units may contribute substantially to these costs, inefficiencies, etc.

Thus, it is desirable to provide a high-quality fenestration unit with glazing that is highly weather resistant and robust. Furthermore, it is desirable to provide such units at reduced costs, using features that increase manufacturing efficiency. Other desirable features and characteristics of the present disclosure will become apparent from the subsequent detailed description and the appended claims, taken in conjunction with the accompanying drawings and this background discussion.

BRIEF SUMMARY

This is solved by the subject-matter of the independent claims. Further embodiments are included in the dependent claims.

In one embodiment, a wet glazing shield gasket is disclosed for a fenestration unit having a glazing unit supported by a frame and a seal member therebetween. The glazing shield gasket comprises a support portion configured to attach to the frame. The glazing shield gasket further includes a sweep that extends from the support portion and that terminates at a barrier lip. The sweep is supported for resilient flexure between a neutral position and a flexed position relative to the support portion. Furthermore, the barrier lip is configured to engage the glazing unit for collapsing the sweep onto the support portion as the sweep flexes away from the neutral position and toward the flexed position. The sweep is configured to extend between the frame and the glazing unit and to be a barrier for the seal member as the sweep flexes away from the neutral position and toward the flexed position. The sweep and the support portion are configured to layer over each other and cooperatively occupy a gap between the glazing unit and the frame when in the flexed position.

In another embodiment, a method of manufacturing a fenestration unit is disclosed. The method includes providing a frame member. The method also includes attaching a support portion of a wet glazing shield gasket to the frame member. The wet glazing shield gasket includes a sweep that extends from the support portion and that terminates at a barrier lip. The sweep is supported for resilient flexure between a neutral position and a flexed position relative to the support portion. Moreover, the method includes applying a sealant to the frame member and moving at least one of the frame member and a glazing unit relative to the other. This includes engaging the barrier lip with the glazing unit for collapsing the sweep onto the support portion as the sweep flexes away from the neutral position and toward the flexed position. This also includes extending the sweep between the frame and the glazing unit to be a barrier for the seal member as the sweep flexes away from the neutral position and toward the flexed position. Furthermore, this includes layering the sweep over the support portion to cooperatively occupy a gap between the glazing unit and the frame when in the flexed position.

In an additional embodiment, a fenestration unit is disclosed that includes a glazing unit, a frame, and a sealant between the glazing unit and the frame. The fenestration unit further comprises a wet glazing shield gasket that includes a support portion attached to the frame and a sweep that extends from the support portion and that terminates at a barrier lip. The sweep is attached to the support portion and is resiliently flexed from a neutral position to a flexed position relative to the support portion. The barrier lip is engaged with the glazing unit and the sweep is collapsed onto the support portion in the flexed position. The sweep is configured to extend between the frame and the glazing unit and to be a barrier for the seal member as the sweep flexes away from the neutral position and toward the flexed position. The sweep and the support portion are layered over each other and are cooperatively occupying a gap between the glazing unit and the frame in the flexed position.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a fenestration unit with a glazing unit that is supported in a frame with a glazing shield gasket included therebetween. The glazing unit may be sealed to the frame via a wet glazing process, and the glazing shield gasket may facilitate and improve the wet glazing process. The glazing shield gasket may also be manufactured efficiently and may increase manufacturing efficiency for the fenestration unit.

In some embodiments, the glazing shield gasket may include a support portion that attaches to the frame. The glazing shield gasket may further include a sweep that is resiliently and flexibly attached to the support portion. As the glazing unit is installed, the glazing unit may engage the sweep, thereby causing the sweep to resiliently flex toward the support portion. Furthermore, as the glazing unit moves into position, the glazing shield gasket may act as a barrier to flowing sealant that is disposed between the glazing unit and the frame. Specifically, the sweep may span between the glazing unit and the support portion as the glazing unit is moved into position. Sealant may be squeezed from its initial application as the glazing unit is moved into position, and the sweep may limit flow of the sealant. The glazing shield gasket may collapse on itself as the glazing unit is moved into position on the frame, and this action may squeeze sealant back toward the interior of the frame instead of flowing outward. The gasket may remain barrier as the glazing unit is moved into position. This sealant may, thus, be positioned as intended to provide a weather resistant seal for the fenestration unit.

Accordingly, the glazing unit may be installed efficiently, using relatively few parts. The sealant may be applied accurately. The resulting seals for the glazing unit may be highly robust as a result. Also, the weather resistance of the fenestration unit may be ensured due to proper sealant placement.

Figure 1:
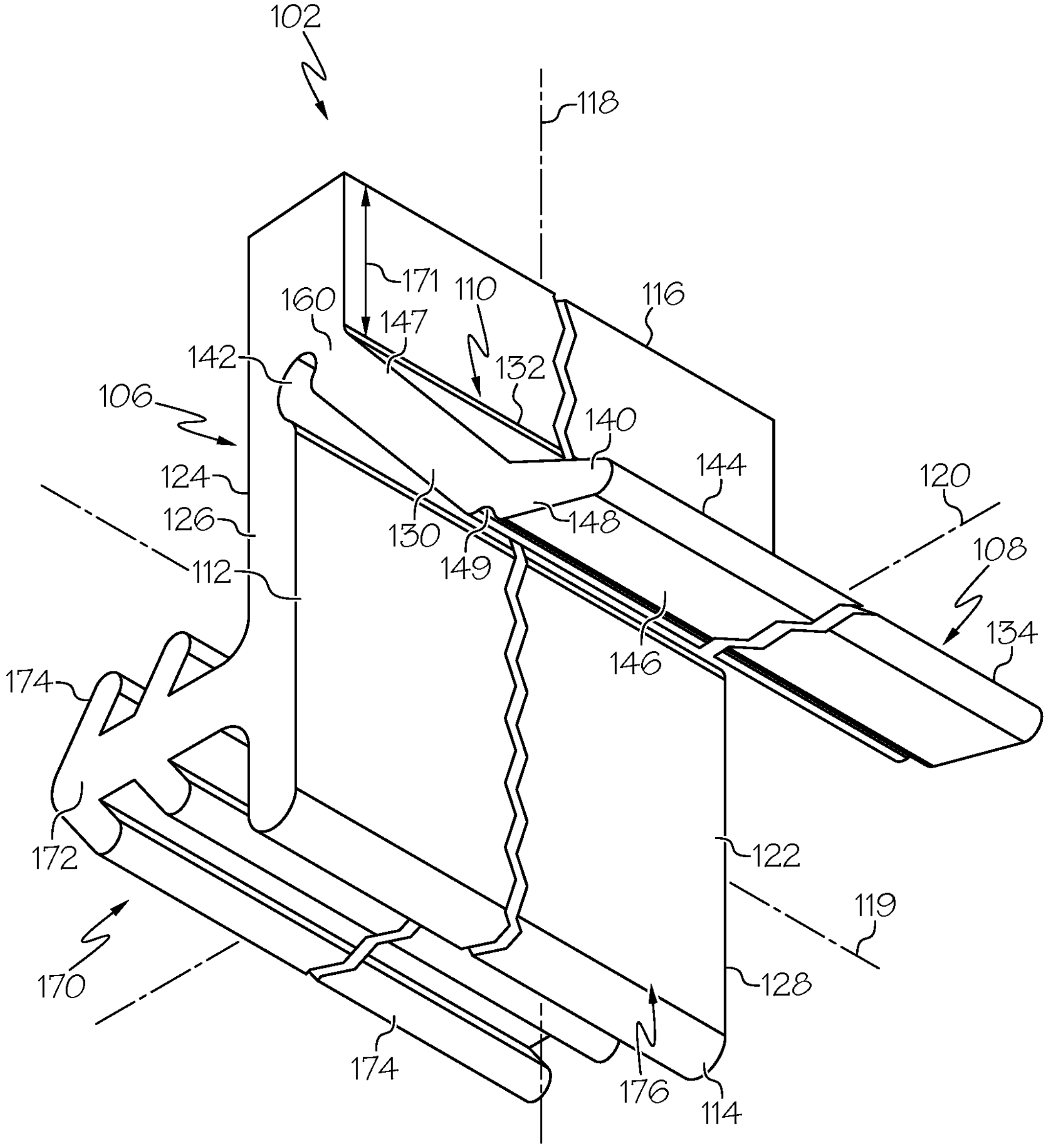
FIG. 1 is a first perspective view of a glazing shield gasket according to example embodiments of the present disclosure.
Figure 5:
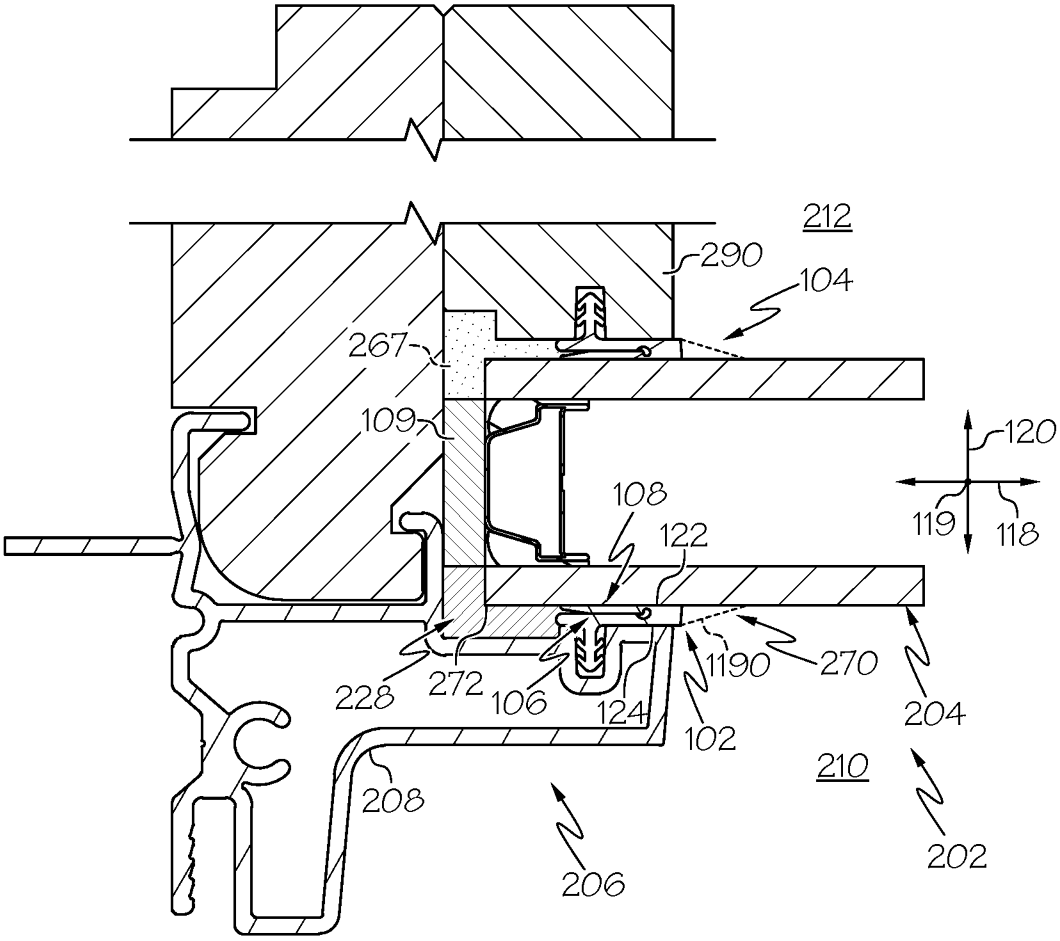
FIG. 5 is a section view of the fenestration unit of FIGS. 3 and 4 with a plurality of the glazing shield gaskets of FIGS. 1-2 according to example embodiments.

Referring now to FIG. 1, a wet glazing shield gasket 102 (i.e., shield gasket 102) is illustrated according to example embodiments of the present disclosure. The shield gasket 102 may be included in a fenestration unit 202 as shown in FIG. 5. The fenestration unit 202 may be a window, a glazed door, a skylight, a side lite, or other configuration without departing from the scope of the present disclosure. The shield gasket 102 may be included between a glazing unit 204 and a frame 206 of the fenestration unit 202.

As shown in FIG. 5, the shield gasket 102 may be a first shield gasket 102 of the fenestration unit 202, and the fenestration unit 202 may include a second shield gasket 104. The first shield gasket 102 may be disposed on an exterior side 210 of the fenestration unit 202, and the second shield gasket 104 may be disposed on an interior side 212 of the fenestration unit 202.

Figure 2:
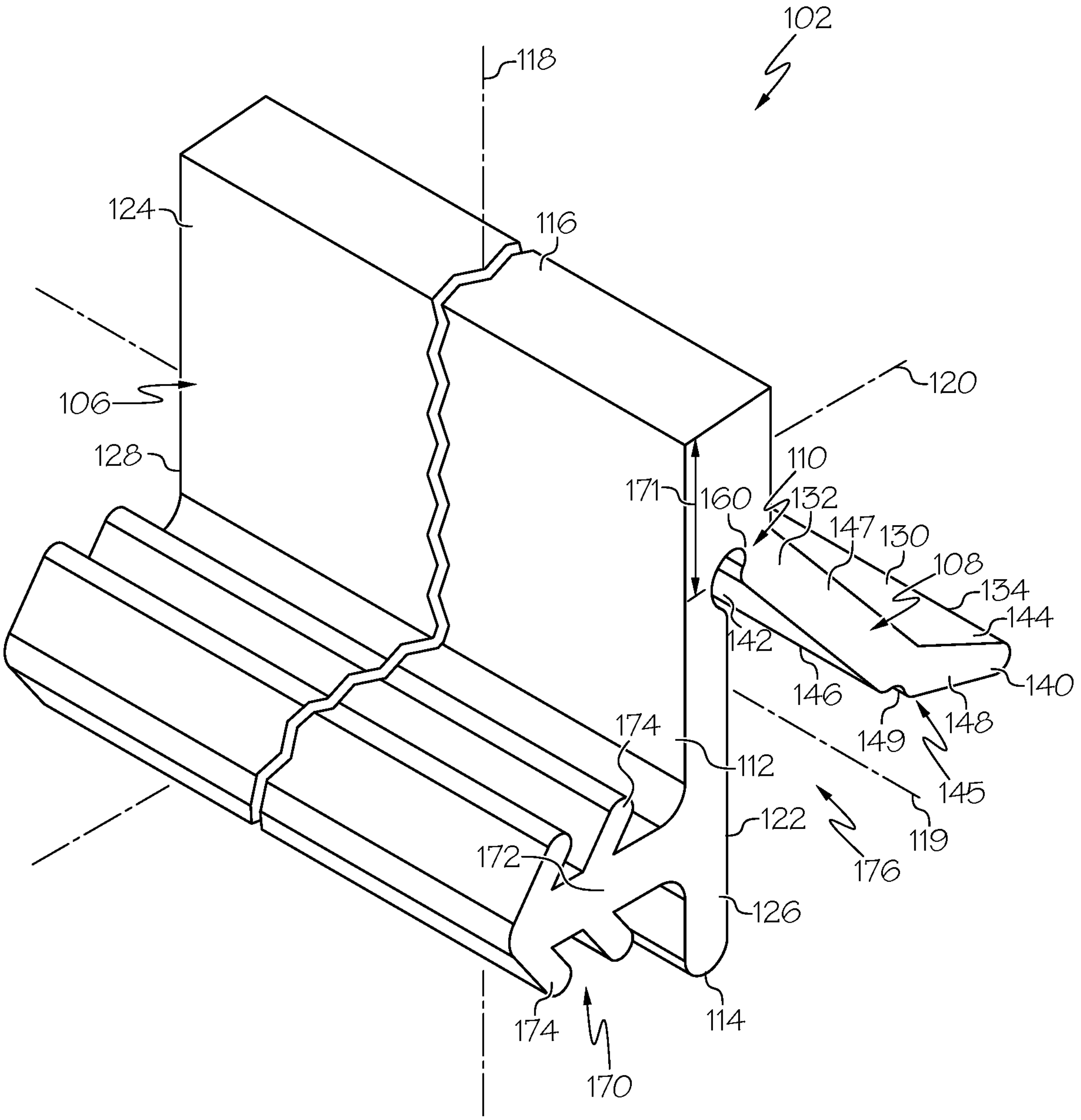
FIG. 2 is a second perspective view of the glazing shield gasket of FIG. 1.

The first shield gasket 102 is shown in detail in FIGS. 1 and 2, and it will be appreciated that the second shield gasket 104 may be substantially similar. For reference, a Cartesian coordinate system is shown in relation to the shield gasket 102. The shield gasket 102 may define a first axis 119, a second axis 118, and a third axis 120, which are normal to each other. When the fenestration unit 202 is installed in a structure, the second axis 118 may be directed vertically (along the direction of gravity). However, as will be discussed, during assembly of the fenestration unit 202 (FIGS. 3-5), the third axis 120 may be directed vertically (along the direction of gravity).

The shield gasket 102 may be elongate, strip-like, unitary, one-piece, and monolithic. The shield gasket 102 may extend along the first axis 119 (i.e., longitudinal axis). The shield gasket 102 may be formed of a polymeric material in some embodiments, such as a thermoplastic elastomer. In some embodiments, the shield gasket 102 may be formed from thermoplastic vulcanizates (TPV). In some embodiments, the shield gasket 102 may be formed via an extrusion process. However, it will be appreciated that the shield gasket 102 may be formed otherwise without departing from the scope of the present disclosure.

Generally, the shield gasket 102 may include a support portion 106 and a sweep 108. The sweep 108 may be supported for resilient flexure between a neutral position (e.g., FIGS. 1, 2, and 3) and a flexed position (e.g., FIGS. 4 and 5) relative to the support portion 106. For example, the sweep 108 may be attached to the support portion 106 via the pivot joint 110 so as to be rotatable between the neutral position and the flexed position. The sweep 108 may pivot about an axis that is parallel to the first axis 119. In the neutral position (FIGS. 1-3), the sweep 108 may project from the support portion 106. In the flexed position (FIGS. 4 and 5), the sweep 108 may be folded onto the support portion 106 to overlap. In the flexed position, the collective shape of the sweep 108 and support portion 106 may have a rectangular cross section that extends substantially continuously and strip-like along the longitudinal axis 119. However, it will be appreciated that the support portion 106, the pivot joint 110, and/or the sweep 108 may be otherwise shaped, dimensioned, attached, and configured without departing from the scope of the present disclosure.

The support portion 106 may include an elongate strip 112. The strip 112 may have a bottom edge 114 and a top edge 116 that are separated along the second axis 118. The bottom edge 114 and top edge 116 may be elongate and may run along the first axis 119 of the gasket 102. The bottom edge 114 may be rounded in some embodiments. The bottom edge 114 may be thinner than the top edge 116. The top edge 116 may be relatively flat. When installed (FIG. 5), the bottom edge 114 may be disposed between the glazing unit 204 and the frame 206. The top edge 116 may be exposed from therebetween. The top edge 116 may be inclined, contoured, sloped, or otherwise configured and shaped such that moisture, water, droplets, snow melt, sleet, etc. runs off the top edge 116. For example, the top edge 116 may be inclined, sloped, and angled with respect to both the first and second axes 119, 118. Thus, the top edge 116 may be sloped downward and away from the glazing unit 204 and with respect to the direction of gravity to promote runoff.

The strip 112 may also include a first side 122 and a second side 124, which face in opposite directions along the third axis 120. When installed in the fenestration unit 202, the first side 122 may face toward the glazing unit 204, and the second side 124 may face away from the glazing unit 204 and toward a lineal frame member 208 of the frame 206.

The strip 112 may further include a first longitudinal end 126 and a second longitudinal end 128, which are separated along the first axis 119. The strip 112 may be of any suitable length (measured between the first and second longitudinal ends 126, 128), and the length may be measured according to a corresponding width of the fenestration unit 202.

The sweep 108 may include a strip 130. The strip 130 may be cantilevered with respect to the strip 112 of the support portion 106 when in the neutral position. The strip 130 may include an attached end 132 and a terminal edge 134. The attached end 132 may be attached to the support portion 106 via the pivot joint 110. As such, the attached end 132 may be cantilevered and supported at the attached end 132 to the support portion 106. The strip 130 may be attached along a majority of the longitudinal length of the shield gasket 102. The strip 130 may extend away from the support portion 106, downward along the second axis 118 and also along the third axis 120 (toward the glazing unit 204). The strip 130 may terminate at a barrier lip 140, which may be defined at the edge 134. The barrier lip 140 may be rounded in some embodiments.

The strip 130 may also include a first side 144 and a second side 146. The first side 144 may face the glazing unit 204 in some embodiments. The second side 146 may face the support portion 106. In the neutral position (FIGS. 1-3), the second side 146 may be spaced away from the first side 122 of the support portion 106. In the flexed position (FIGS. 4-5), the second side 146 may be in contact with and overlaid over the first side 122 of the support portion 106. Also, in the flexed position, the barrier lip 140 may be disposed proximate the bottom edge 114 of the support portion 106.

Figure 3:
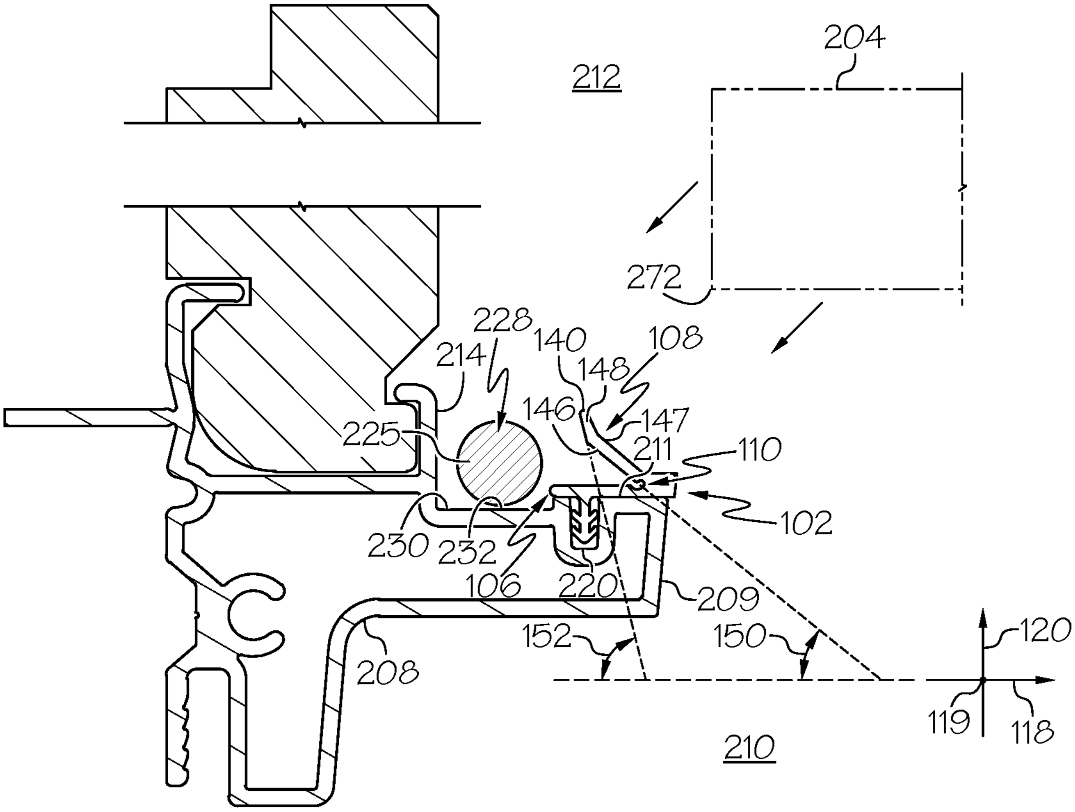
FIG. 3 is a section view of parts of a fenestration unit, including the glazing shield gasket of FIGS. 1-2, shown attached thereto in a first position.

The strip 130 may include a kickout 145 (FIG. 2), which may be evident when the strip 130 is in the neutral position, and which may include the barrier lip 140. Because of the kickout 145, the strip 130 may be divided into a first portion 147 and a second portion 148. The first portion 147 may include the attached end 132, and the second portion 148 may include the barrier lip 140. The second portion 148 may be attached at a rotational joint (a kickout joint 149). The kickout joint 149 may be a living hinge (e.g., an area where the wall thickness of the sweep 108 is reduced compared to the surrounding areas of the sweep 108). As shown in FIG. 3, in the neutral position, the first portion 147 may be relatively flat and may extend at a first angle 150 relative to the support portion 106 (i.e., relative to the axis 118). The first angle 150 may be less ninety degrees. The second portion 148 may be relatively flat and may be upturned at the kickout joint 149 so as to extend at a second angle 152 relative to the support portion 106. The second angle 152 may be less than ninety degrees and greater than the first angle 150. As shown in FIG. 3, when in the neutral position and attached to the lineal frame member 208 (before installation of the glazing unit 204), the sweep 108 may extend away from the support portion 106, and the barrier lip 140 may be directed substantially along the third axis 120 due to the kickout 145.

The pivot joint 110 may include a living hinge 160 (i.e., an area of reduced wall thickness that extends longitudinally along the axis 119). The pivot joint 110 may include an elongate, contoured slot 142 that defines the living hinge 160. As shown, the slot 142 may have a rounded, knob-shaped profile and may extend along the longitudinal axis 119. The sweep 108 may pivot about the hinge 160 to vary the first angle 150 (FIG. 3) when moving between the neutral position and the flexed position. Furthermore, the second portion 148 may pivot relative to the first portion 147 at the kickout 145 to vary the second angle 152 when moving between the neutral position and the flexed position. This flexure may be elastic and resilient flexure between the neutral and flexed positions.

Moreover, the slot 142 and the living hinge 160 may be spaced away at a distance 171 along the axis 118 from the top edge 116. Accordingly, the sweep 108 may be moveable into and out of a terrace step 176 in the support portion 106. In the neutral position, the sweep 108 may project out of the terrace step 176. In the flexed position, the sweep 108 may be received within the terrace step 176. The wall thickness of the support portion 106 above the hinge 160 may be substantially equal to the combined wall thickness of the sweep 108 and the support portion 106 below the hinge 160. Accordingly, when the sweep 108 is in the flexed position, the sweep 108 may be received within the terrace step 176 and flush with the other portions of the support portion 106.

The shield gasket 104 may further include a retainer projection 170 for attaching to the frame 206 of the fenestration unit 202. The projection 170 may include a rail 172 that projects from the second side 124 of the support portion 106. The rail 172 may also include one or more fins 174 that branch therefrom. The fins 174 may be resilient and flexible relative to the rail 172.

The sweep 108 may be biased toward the neutral position, wherein the sweep 108 is spaced apart from the support portion 106. The material and/or structural properties of the shield gasket 102 may provide the biasing force needed to bias the sweep 108 away from the flexed position and toward the first, neutral position.

Embodiments will now be discussed with regard to manufacture and assembly of the shield gasket 102 and the fenestration unit 202. As mentioned, the shield gasket 102 may be of unitary, one-piece construction. Also, the shield gasket 102 may be formed via an extrusion process and may be extruded along the axis 119. The shield gasket 102 may be trimmed to any suitable length (measured along the axis 119).

In some embodiments, assembly of the fenestration unit 202 may include insertion of the retainer projection 170 into a corresponding slot opening 220 of the frame 206. In some embodiments, the lineal frame member 208 may be a sill member, a cladding piece, an extruded part, etc. In some embodiments, the lineal frame member 208 may be a hollow and relatively thin walled part. The lineal frame member 208 may include a glazing support flange 209 with a raised interior-facing surface 211 included thereon. The surface 211 may be raised toward the interior side 212 of the fenestration unit 202 so as to define a channel 230 between the surface 211 and an attachment portion 214 of the lineal frame member 208. The attachment portion 214 may clamp, fasten, or otherwise attach to other members (e.g., wood, composite, or other structural members) of the frame 206. The slot opening 220 may be open through the interior-facing surface 211 and may be closed at its bottom end.

The retainer projection 170 of the shield gasket 104 may be manually pushed into the slot opening 220 for attachment to the frame member 208. In some embodiments, the frame member 208 may be disposed horizontally during this assembly process such that the interior side 212 faces upward and such that the retainer projection 170 may be pushed downward (with the force of gravity) into the slot opening 220.

Also, with the frame member 208 in this position, a bead 225 of fluid, flowable, sealant 228 (i.e., wet sealant) may be laid onto or otherwise provided onto an interior surface 232 of the interior channel 230. The bead 225 may be applied in a direction along the axis 119 into the channel 230. The bead 225 may be applied before, during, or after the shield gasket 104 is attached to the frame member 208. It will be appreciated that, in some embodiments, the shield gasket 102 may be attached before the bead 225 is applied so that the shield gasket 102 may act as a barrier to contain the bead 225 within the channel 230.

Figure 4:
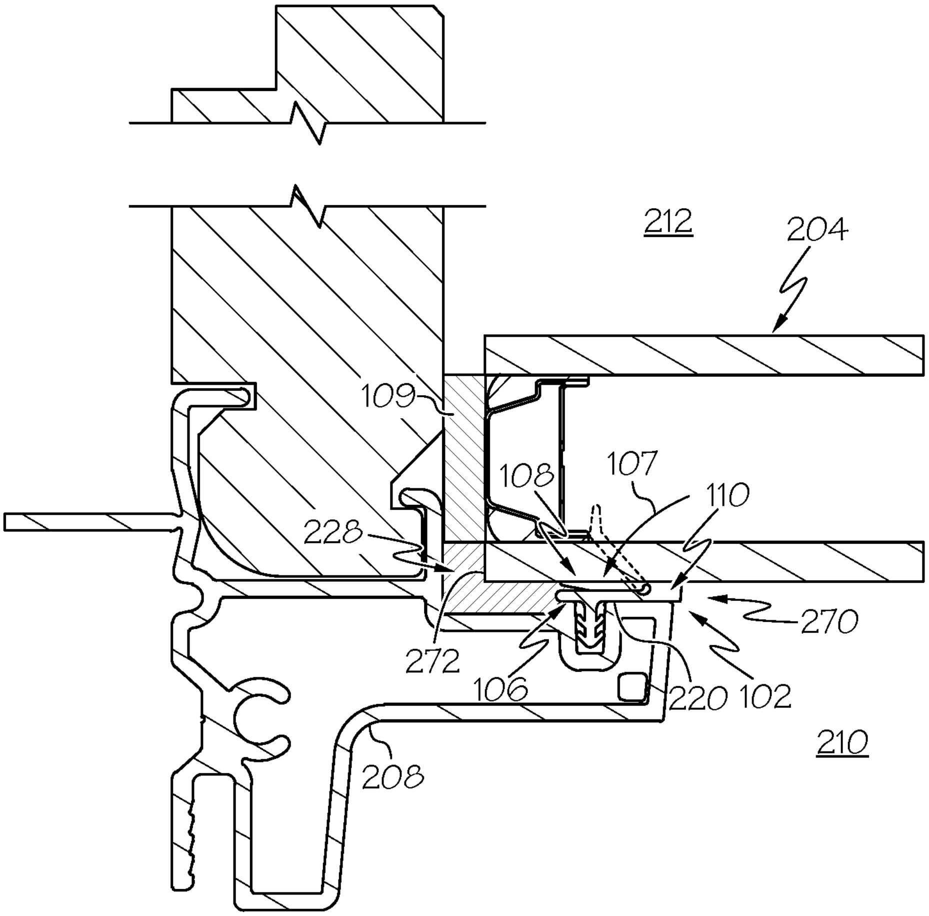
FIG. 4 is a section view of the fenestration unit of FIG. 3 with a glazing unit and the glazing shield gasket of FIGS. 1-2 shown in a second position.

Subsequently, the glazing unit 204 may be provided and moved relative to the frame member 208 as shown in FIGS. 3 and 4. The glazing unit 204 may be moved toward the frame member 208 so as to eventually engage and abut the barrier lip 140 of the shield gasket 102. In some embodiments, the weight of the glazing unit 204 may be applied to the barrier lip 140 so as to flex the sweep 108 toward the support portion 106 as indicated by arrow 107 in FIG. 4. In other words, the barrier lip 140 may engage the glazing unit 204, and the sweep 108 may collapse onto the support portion 106, flexing away from the neutral position and toward the flexed position.

The glazing unit 204 may be supported in position relative to the frame with a spacer 109 as shown in FIG. 4. With the glazing unit 204 in position, the sweep 108 may lie flat and overlay the support portion 106. Also, the kickout joint 149 may be substantially aligned along the axis 120 with the retainer projection 170 in the flexed position. Resiliency of the shield gasket 102 may serve to drive the retainer projection 170 further into the slot opening 220 for robust attachment to the frame 206. The sweep 108 and the support portion 106 may layer over each other and cooperatively occupy a gap 270 between the glazing unit 204 and the frame 206 (FIGS. 4 and 5). The gap 270 may be measured along the axis 120, and the gap 270 may be filled, collectively, by the sweep 108 and the support portion 106. The pivot joint 110 may flex and the kickout joint 149 may also flex as the sweep 108 moves to the flexed position. The sweep 108 may, however, be biased toward the neutral position to maintain a barrier for the sealant 228 as the glazing unit 204 is positioned.

More specifically, the sweep 108 may be configured as a barrier for the sealant 228 as the glazing unit 204 is positioned on the frame member 208. An edge 272 of the glazing unit 204 may contact and push into the bead 225, causing the sealant 228 to flow around the edge 272. The sealant 228 may squeeze around the edge 272 and at least some may flow generally out from within the frame 206 as the glazing unit 204 comes to rest on the shield gasket 102. The barrier lip 140 may remain in contact and engaged with the glazing unit 204 as the glazing unit 204 is positioned in the frame 206. Accordingly, the second side 146 (i.e., the underside) of the sweep 108 may block flow of the sealant 228 that happens to move in an outward direction from the frame 206 and outward from the edge 272. This sealant 228 may be re-directed back into the frame 206 and back toward the edge 272 by the sweep 108. Sealant 228 that flows between the second side 146 of the sweep 108 and the first side 122 of the support portion 106 may be squeezed out back into the frame 206 as the sweep 108 moves to the flexed position. Then, as the glazing unit 204 comes to rest on the shield gasket 102 (FIG. 4), the sealant 228 may be shaped by the edge 272, the bottom edge 114 and terminal edge 134 of the shield gasket 102, as well as the opposing surfaces of the frame member 208. Subsequently, the sealant 228 may be cured so as to define a high-quality weather seal between the frame 206 and the glazing unit 204.

Next, as shown in FIG. 5, the second shield gasket 104 may be installed in the interior portion of the frame 206 (e.g., attached to a frame bead 290). The frame bead 290 may attached to the previously assembled frame components, and the second shield gasket 104 may be flexed and positioned on the interior side 212 of the glazing unit 204, similar to the first shield gasket 102.

As an optional feature, a bead for an interior seal 267 may be applied (as shown in phantom) before the second shield gasket 104 is installed. Like the first shield gasket 102, the second shield gasket 104 may define a barrier for the flowing sealant of the interior seal 267 as the frame bead 290 is attached.

Accordingly, the shield gasket 102 (and in some embodiments the shield gasket 104) may contain and control flow of the sealant for sealing the glazing unit 204 to the frame 206. This may ensure proper sealing of the glazing unit 204 to the frame 206. This may also increase manufacturing efficiency.

Figure 6:
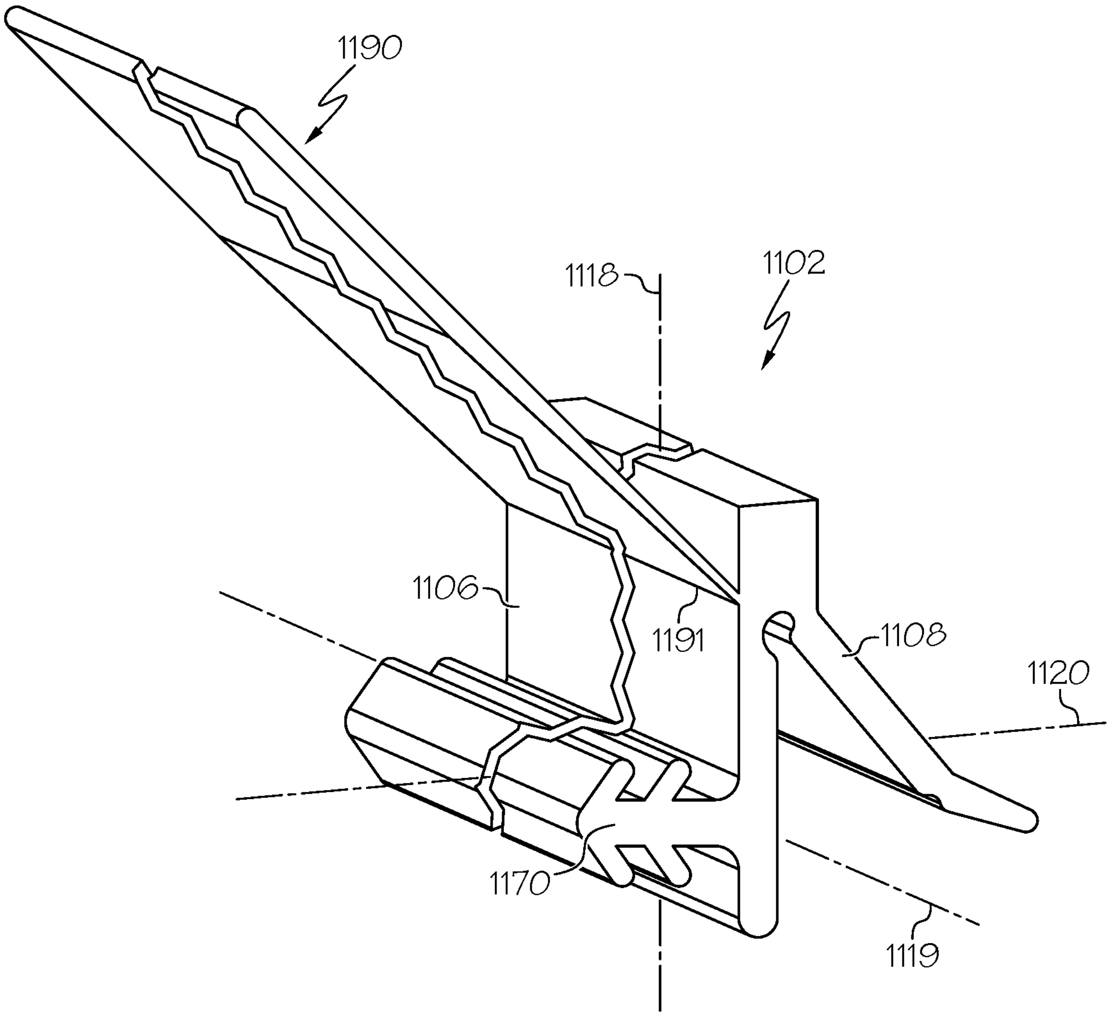
FIG. 6 is a perspective view of the glazing shield gasket according to additional embodiments of the present disclosure.

Referring now to FIG. 6, the shield gasket 1102 is shown according to additional embodiments of the present disclosure. The shield gasket 1102 may be substantially similar to the embodiments of FIGS. 1-5 except as noted. Components that correspond to those of FIGS. 1-5 are indicated with corresponding reference numbers increased by 1000.

As shown, the shield gasket 1102 may include a masking strip 1190 that is attached to the support portion 1106. The masking strip 1190 may be a tape-like flap that extends from the support portion 1106 upwards and along the third axis 1120. The masking strip 1190 may be flexible and may be integral with the support portion 1106. The masking strip 1190 may be attached to the support portion 1106 on a side that is opposite the sweep 1108. The masking strip 1190 may be spaced apart along the axis 1120 from the retainer projection 1170.

As shown in phantom in FIG. 5, when installed, the masking strip 1190 may fold up onto the glazing unit 204 so as to mask an exposed margin or periphery of the glazing unit 204. The masking strip 1190 may be taped or otherwise attached to the glazing unit 204 for masking purposes. It will be appreciated that the masking strip 1190 may similarly be layered onto and attached to the frame 206 to mask areas lying underneath. Accordingly, the masking strip 1190 may facilitate painting, spray-on texturing, or other improvements around the fenestration unit 202.

The masking strip 1190 may be attached to the support portion 1106 via a tear-away joint 1191. This joint 1191 may be perforated and/or substantially thinner than surrounding portions such that the masking strip 1190 may be manually removed, leaving the shield gasket 1102 in place in the fenestration unit 202. In additional embodiments, the masking strip 1190 may be cut or otherwise removed from the fenestration unit 202 when no longer needed.

Furthermore, the following examples are provided:

In an example, a wet glazing shield gasket for a fenestration unit having a glazing unit supported by a frame and a seal member therebetween is disclosed. The glazing shield gasket comprises a support portion configured to attach to the frame. The glazing shield gasket further includes a sweep that extends from the support portion and that terminates at a barrier lip. The sweep is supported for resilient flexure between a neutral position and a flexed position relative to the support portion. Furthermore, the barrier lip is configured to engage the glazing unit for collapsing the sweep onto the support portion as the sweep flexes away from the neutral position and toward the flexed position. The sweep is configured to extend between the frame and the glazing unit and to be a barrier for the seal member as the sweep flexes away from the neutral position and toward the flexed position. The sweep and the support portion are configured to layer over each other and cooperatively occupy a gap between the glazing unit and the frame when in the flexed position.

In an option, the wet glazing shield gasket includes a pivot joint that rotatably joins the sweep to the support portion for rotational and resilient flexure between the neutral position and the flexed position.

In an additional option, the sweep includes a strip that is attached to the support portion at the pivot joint. The strip is cantilevered and extends away from the support portion and terminates at the barrier lip.

Furthermore, in another option, the strip is disposed at a first angle relative to the support portion in the neutral position. The first angle is less than ninety degrees.

In an additional option, the strip, in the neutral position, includes a kickout that is disposed at a second angle relative to the support portion. The kickout includes the barrier lip. The second angle is less than ninety degrees and greater than the first angle.

Also, in an option, the wet glazing shield gasket further comprises a retainer projection that projects from the support portion. The retainer projection is configured to be inserted in the frame for attachment to the frame. The kickout extends from a kickout pivot joint. When the sweep is in the flexed position, the kickout pivot joint is supported on the support portion opposite the retainer projection.

In an additional option, the strip is configured to lie flat and overlay the support portion in the flexed position.

Moreover, in an option, the support portion includes a top edge and a bottom edge. The bottom edge is configured to be disposed in the gap, and the top edge is configured to be exposed from between the glazing unit and the frame. The pivot joint is spaced apart at a distance from the top edge.

In another option, the support portion includes a first surface configured to face the glazing unit. The top edge is disposed at an angle relative to the glazing unit for moisture runoff relative to the glazing unit.

In an additional option, the wet glazing shield gasket further includes a masking strip that extends from the support portion. The masking strip is configured to attach to at least one of the glazing unit and the frame for masking the fenestration unit.

In an additional example, the masking strip is manually removable from the support portion.

In an additional option, the wet glazing shield gasket includes a fastening projection that projects from the support portion. The fastening projection is configured to be received in the frame to support the wet glazing shield gasket on the frame.

In an additional example, a method of manufacturing a fenestration unit includes providing a frame member. The method also includes attaching a support portion of a wet glazing shield gasket to the frame member. The wet glazing shield gasket includes a sweep that extends from the support portion and that terminates at a barrier lip. The sweep is supported for resilient flexure between a neutral position and a flexed position relative to the support portion. Moreover, the method includes applying a sealant to the frame member and moving at least one of the frame member and a glazing unit relative to the other. This includes engaging the barrier lip with the glazing unit for collapsing the sweep onto the support portion as the sweep flexes away from the neutral position and toward the flexed position. This also includes extending the sweep between the frame and the glazing unit to be a barrier for the seal member as the sweep flexes away from the neutral position and toward the flexed position. Furthermore, this includes layering the sweep over the support portion to cooperatively occupy a gap between the glazing unit and the frame when in the flexed position.

In an additional option, collapsing the sweep includes rotating the sweep toward the support portion about a pivot joint of the shield gasket for resiliently flexing the sweep from the neutral position toward the flexed position.

Furthermore, as another option, collapsing the sweep includes lying the sweep flat over the support portion in the flexed position.

In an additional option, the method further comprises extending a masking strip of the shield gasket from the support portion toward at least one of the glazing unit and the frame. The method also includes attaching the masking strip to the one of the glazing unit and the frame for masking the fenestration unit.

In an additional option, the method further comprises manually removing the masking strip from the support portion.

In a further example, a fenestration unit comprises a glazing unit, a frame, and a sealant between the glazing unit and the frame. The fenestration unit further comprises a wet glazing shield gasket that includes a support portion attached to the frame and a sweep that extends from the support portion and that terminates at a barrier lip. The sweep is attached to the support portion and is resiliently flexed from a neutral position to a flexed position relative to the support portion. The barrier lip is engaged with the glazing unit and the sweep is collapsed onto the support portion in the flexed position. The sweep is configured to extend between the frame and the glazing unit and to be a barrier for the seal member as the sweep flexes away from the neutral position and toward the flexed position. The sweep and the support portion are layered over each other and are cooperatively occupying a gap between the glazing unit and the frame in the flexed position.

As another option, the shield gasket further includes a pivot joint that rotatably joins the sweep to the support portion for rotational and resilient flexure between the neutral position and the flexed position.

In an additional option, the sweep includes a strip that is attached to the support portion at the pivot joint. The strip is cantilevered and extends away from the support portion and terminates at the barrier lip.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A fenestration unit comprising:
- a glazing unit;
- a frame that supports the glazing unit with a gap defined therebetween;
- a seal member between the glazing unit and the frame; and
- a wet glazing shield gasket that includes:
  - a support portion attached to the frame, the support portion including a top edge and a bottom edge;
  - a sweep that extends from the support portion and that terminates at a barrier lip;
  - a pivot joint that rotatably joins the sweep and the support portion, the sweep supported for resilient flexure between a neutral position and a flexed position relative to the support portion;
  - the bottom edge facing into the gap, and the top edge facing out of the gap from between the glazing unit and the frame, the pivot joint being spaced apart at a distance from the top edge;
  - the barrier lip configured to engage the glazing unit for collapsing the sweep onto the support portion as the sweep flexes away from the neutral position and toward the flexed position;
  - the sweep configured to extend between the frame and the glazing unit and to be a barrier for the seal member as the sweep flexes away from the neutral position and toward the flexed position;

the sweep and the support portion layered over each other and cooperatively occupying the gap between the glazing unit and the frame when in the flexed position.

2. The fenestration unit of claim 1, wherein the sweep includes a strip that is attached to the support portion at the pivot joint; and wherein the strip is cantilevered and extends away from the support portion and terminates at the barrier lip.

3. The fenestration unit of claim 2, wherein the strip is disposed at a first angle relative to the support portion in the neutral position, the first angle being less than ninety degrees.

4. The fenestration unit of claim 3, wherein the strip, in the neutral position, includes a kickout that is disposed at a second angle relative to the support portion, the kickout including the barrier lip, the second angle being less than ninety degrees and greater than the first angle.

5. The fenestration unit of claim 4, further comprising a retainer projection that projects from the support portion, the retainer projection configured to be inserted in the frame for attachment to the frame;

wherein the kickout extends from a kickout pivot joint; and wherein, when the sweep is in the flexed position, the kickout pivot joint is supported on the support portion opposite the retainer projection.

6. The fenestration unit of claim 2, wherein the strip is configured to lie flat and overlay the support portion in the flexed position.

7. The fenestration unit of claim 1, wherein the support portion includes a first surface configured to face the glazing unit; and wherein the top edge is disposed at an angle relative to the first surface and is configured for moisture runoff relative to the glazing unit.

8. The fenestration unit of claim 1, further comprising a fastening projection that projects from the support portion, the fastening projection configured to be received in the frame to support the wet glazing shield gasket on the frame.

9. A wet glazing shield gasket for a fenestration unit having a glazing unit supported by a frame and a seal member therebetween, the glazing shield gasket comprising:

a support portion configured to attach to the frame;

a sweep that extends from the support portion and that terminates at a barrier lip, the sweep supported for resilient flexure between a neutral position and a flexed position relative to the support portion;

the barrier lip configured to engage the glazing unit for collapsing the sweep onto the support portion as the sweep flexes away from the neutral position and toward the flexed position;

the sweep configured to extend between the frame and the glazing unit and to be a barrier for the seal member as the sweep flexes away from the neutral position and toward the flexed position;

the sweep and the support portion configured to layer over each other and cooperatively occupy a gap between the glazing unit and the frame when in the flexed position; and a masking strip that extends from the support portion, the masking strip configured to attach to at least one of the glazing unit and the frame for masking the fenestration unit.

10. The wet glazing shield gasket of claim 9, wherein the masking strip is manually removable from the support portion.

11. The wet glazing shield gasket of claim 9, further comprising a fastening projection that projects from the support portion, the fastening projection configured to be received in the frame to support the wet glazing shield gasket on the frame.

12. The wet glazing shield gasket of claim 9, wherein the sweep includes a strip that is attached to the support portion at a pivot joint; and wherein the strip is cantilevered and extends away from the support portion and terminates at the barrier lip.

13. The wet glazing shield gasket of claim 12, wherein the pivot joint includes a wall having a wall thickness less than that of an adjacent portion of the wet glazing shield, wherein the pivot joint includes a slot, the wall and the slot defining a living hinge of the pivot joint.

14. A fenestration unit comprising:

a glazing unit;

a frame member that supports the glazing unit with a gap defined therebetween;

a sealant between the glazing unit and the frame member; and a wet glazing shield gasket disposed in the gap and that includes:

a support portion attached to the frame member, the support portion including a first edge and a second edge, the first edge facing out of the gap and the second edge facing into the gap;

a sweep that is attached to the support portion proximate the first edge, the sweep cantilevered with respect to the support portion to extend inward into the gap away from the first edge and toward the second edge and terminate within the gap, the sweep resiliently flexed from a neutral position to a flexed position relative to the support portion;

the sweep engaged with the glazing unit and layered on the support portion in the flexed position;

the sweep and the support portion configured to extend between the frame member and the glazing unit and to be a barrier for the sealant as the sweep flexes away from the neutral position and toward the flexed position;

the sweep and the support portion layered over each other and cooperatively occupying the gap between the glazing unit and the frame member in the flexed position.

15. The fenestration unit of claim 14, wherein the wet glazing shield gasket further includes a pivot joint that rotatably joins the sweep to the support portion for rotational and resilient flexure between the neutral position and the flexed position.

16. The fenestration unit of claim 15, wherein the sweep includes a strip that is attached to the support portion at the pivot joint.

17. The fenestration unit of claim 15, wherein the pivot joint includes a wall having a wall thickness less than that of an adjacent portion of the wet glazing shield, wherein the pivot joint includes a slot, the wall and the slot defining a living hinge of the pivot joint.

18. The fenestration unit of claim 15, wherein the pivot joint is spaced apart at a distance from the first edge.

19. The fenestration unit of claim 14, wherein the wet glazing shield gasket includes a masking strip that extends from the support portion, the masking strip attached to at least one of the glazing unit and the frame member for masking the fenestration unit.

20. The fenestration unit of claim 1, wherein the pivot joint includes a wall having a wall thickness less than that of an adjacent portion of the wet glazing shield, wherein the pivot joint includes a slot, the wall and the slot defining a living hinge of the pivot joint.

* * * * *